M. PRUYN.
WEED CUTTER AND CULTIVATOR.
APPLICATION FILED SEPT. 27, 1909.

942,744.

Patented Dec. 7, 1909.

Witnesses:
F. E. Maynard.
R. S. Berry.

Inventor:
Marcellus Pruyn,
By Geo. H. Strong
his Atty.

UNITED STATES PATENT OFFICE.

MARCELLUS PRUYN, OF SACRAMENTO, CALIFORNIA.

WEED-CUTTER AND CULTIVATOR.

942,744.

Specification of Letters Patent. Patented Dec. 7, 1909.

Application filed September 27, 1909. Serial No. 519,693.

*To all whom it may concern:*

Be it known that I, MARCELLUS PRUYN, a citizen of the United States, residing at Sacramento, in the county of Sacramento and State of California, have invented new and useful Improvements in Weed-Cutters and Cultivators, of which the following is a specification.

My invention relates to an improved agricultural apparatus which is designed for cutting weeds and cultivating the soil.

It consists of a frame, with handles, and means for connecting the cutters in such a manner that while the sides may be expanded or contracted, to cut wider or narrower, a simultaneous movement turns the cutter so that the cutters will be held straight with the line of draft.

The invention further consists in the combination of parts, and details of construction which will be more fully explained by reference to the accompanying drawings, in which—

Figure 1:
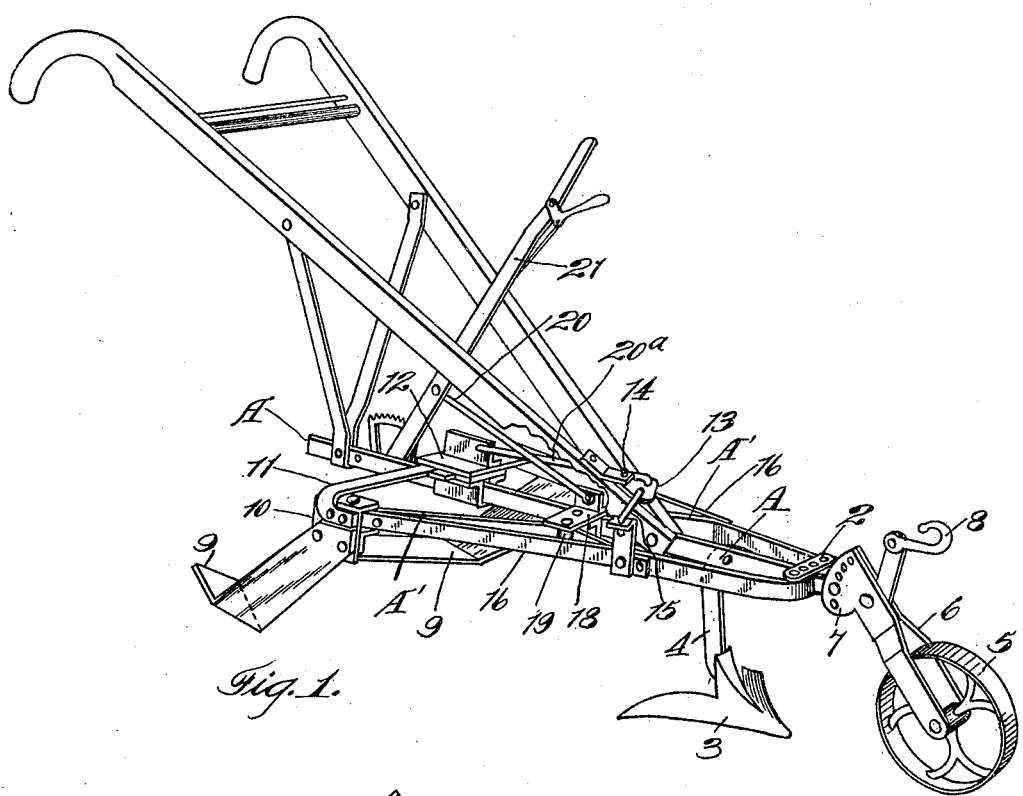
Figure 2:
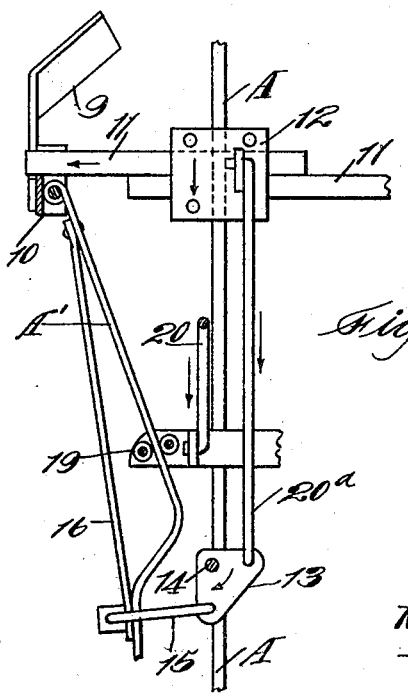

Figure 1 is a perspective view of the device. Fig. 2 is a diagrammatic plan of a portion of the cultivator.

The frame which in the present case is made similar to that of a five toothed cultivator having a central bar, consists of a central bar A, and divergent outer bars A′ which are pivoted or fulcrumed at their front ends to a head 2, fixed to the front end of the bar A.

3 is a suitable cutter carried at the lower end of a standard 4, which standard has its upper end bolted to the central bar A of the frame.

5 is a bearing-wheel journaled in a yoke or frame 6 at the front, and this yoke or frame is pivoted to the front of the main frame, and has a perforated segment 7 which may be connected with the frame behind the pivot point of the yoke, by means of a pin or bolt passing through any one of the holes of the segment, so that the wheel will be raised or lowered with reference to the main frame, and so that the latter may be raised and lowered to suit the depth to which the cutters are to enter the soil. 8 is a draft link also connected with the front of the main frame.

The cutters 9 are bolted to an angle plate 10, which is pivoted through a loop in the rear end of the bar A′ of the main frame. The controlling bars 11 have their outer ends riveted to the pivoted angle plate 10, and the inner ends are slidable through a box or clamp 12 which in turn is slidable upon the center bar A.

13 is a plate which has a fixed pivot 14 about which it is turnable. The front edge of the plate 13 is connected by a link 15 with the brace bar 16 which extends across the inwardly curved portion of the frame bar A′, and serves as a brace therefor.

The frame bars A′ are caused to turn about their pivot points 2 at the front by means of a transverse yoke 18 which has pins or rollers 19 at each end, between which the divergent portions of the frame bars A′ extend so that the rearward movement of this yoke will draw the frame bars and the cutters toward each other, and a movement toward the front will cause the bars and cutters to be separated. This yoke is connected with a hand lever 21 by means of a link or connecting rod 20, and the plate 13 has a connecting rod 20ª uniting it with the slidable box 12, so that when the lever 21 is moved in either direction, the expanding and contracting yoke 16 is moved so as to either expand or contract the side bars A′ of the frame. This acts through the link 15 to turn the plate 13 about its pivot point 14, and by means of the rod 20ª which connects the plate 13 with a longitudinally slidable block 12, the latter would be moved in unison with the expansion or contraction of the side bars of the frame. The transverse controlling bars 11 being slidable through this box and having their outer ends bolted to the angle plate 10 which carries the cutters, it will be seen that the movement of the box 12 will turn the angle plates in unison with the movements of the side frame bars, and in so turning, the angle plate will also turn the cutters 9 which are bolted to the plate, so that the cutters will at all times be held substantially straight with the line of draft.

The connection of the link 15 with the plate 13 is forward of the pivot point 14, and a connection of the link 20ª which unites the plate with the slidable block 12, is at one side of the pivot point 14 so that the plate 13 forms substantially a bell-crank lever pivoted at its angle. The distances of these connections from the pivot point of the plate 13 are so proportioned that the expanding of the outer bars A′ through the connecting links will draw the slidable box 12 forward just far enough to maintain the controlling bars 11 at right angles to the line of draft, and these by reason of being bolted to the angle plates which carry the cutters will also hold the cutters straight in line with the draft. The same result occurs when the side bars A' of the frame are contracted by the reverse movement of the yoke, and the consequent narrowing of the width which the cutters occupy.

When the apparatus is contracted to do narrow work, the central cutter 3 at the front may be removed as the rear cutters will, under these conditions, cut over all the surface of the ground.

It will be understood that cultivator teeth may be substituted for the cutter blades, and moved out or in by the controlling mechanism herein described.

Having thus described my invention what I claim and desire to secure by Letters Patent is—

1. The combination in a weed cutter of a frame, including hinged outer members having the rear ends capable of expansion and contraction with relation to the central portion, cutting blades and angle plates to which the blades are bolted, said plates being pivoted and turnable with relation to the rear ends of the outer frame bars, a box slidable upon the center bar of the frame, connecting bars slidable transversely through said box having their outer ends connected with the pivoted angle plates, a plate pivoted to the forward portion of the frame, and links connecting the pivot plate with the movable frame bars and with the slidable box.

2. The combination in a weed cutter, having hinged frame bars capable of being expanded or contracted, of cutters pivotally connected with said frame bars, transverse controlling bars rigidly connected with the cutters, a central longitudinally movable box through which the controlling bars are slidable means for expanding and contracting the frame bars, and connecting means by which said movements of the frame bars are transmitted to turn the cutters about their pivots.

3. The combination in a cultivator and weed cutter, of a frame having the outer members hinged at the front, means for expanding or contracting the rear ends of said members, cutters pivotally connected with the frame bars, a pivoted bell crank lever or plate, a link connecting one arm of said plate with a movable frame bar, a longitudinally slidable box, controller bars rigidly connected with the pivoted cutters and having their inner ends slidable transversely through the slidable box, a link connecting the other arm of the bell crank with the slidable box, and a hand lever connected with the expanding and contracting means of the frame bars.

4. The combination in a cultivator and weed cutter, of a central longitudinally disposed frame bar, side bars hinged to the center bar at the front and divergent rearwardly, cutters turnably connected with the rear ends of the side bars, a transversely disposed box or traveler slidable upon the center frame bar, and having antifrictional clasping devices engaging the inclined side bars, a lever connected with said slidable member, a second box slidable upon the center bar, transverse bars having their outer ends rigidly connected with the turnable cutters, and their inner ends slidable through said second box, an angular or bell crank plate having its intermediate angle pivoted, a connection between one outer angle and one of the separable frame bars, and a connection between the other angle and the second slidable box.

In testimony whereof I have hereunto set my hand in the presence of two subscribing witnesses.

MARCELLUS PRUYN.

Witnesses:
C. J. CHITTENDEN,
EVALINE M. KERR.